United States Patent [19]

Veenstra

[11] 4,318,943
[45] Mar. 9, 1982

[54] APPARATUS FOR AT LEAST PARTLY REMOVING ADHERING LIQUID FROM AND/OR EVENLY DISTRIBUTING LIQUID OVER THE SURFACE OF ARTICLES

[75] Inventor: Jelle Veenstra, Diepenveen, Netherlands

[73] Assignee: Thomassen & Drijver-Verblifa NV, Derventer, Netherlands

[21] Appl. No.: 87,277

[22] Filed: Oct. 22, 1979

[30] Foreign Application Priority Data

Oct. 23, 1978 [NL] Netherlands .......................... 7810558

[51] Int. Cl.³ ............................................. B05D 5/00
[52] U.S. Cl. ...................................... 427/240; 118/52; 118/56; 118/500; 118/501; 198/431; 198/439; 198/441; 198/457; 221/212; 427/346; 118/55
[58] Field of Search .................. 118/52, 56, 55, 500, 118/501; 427/240, 346; 221/212; 198/431, 439, 441, 456, 457, 459

[56] References Cited

U.S. PATENT DOCUMENTS

| | | | |
|---|---|---|---|
| 2,662,851 | 12/1953 | Jones et al. | 202/170 D |
| 3,024,133 | 3/1962 | White | 118/570 X |
| 3,565,234 | 2/1971 | Birdsong | 198/41 |

FOREIGN PATENT DOCUMENTS

2438972 9/1975 Fed. Rep. of Germany .

*Primary Examiner*—Norman Morgenstern
*Assistant Examiner*—Janyce A. Bell
*Attorney, Agent, or Firm*—Charles E. Brown

[57] ABSTRACT

Apparatus for removing liquid from or evenly distributing liquid over magnetically attractible articles by using centrifugal forces. The articles are fed to a non-magnetic rotating drum, a helical series of magnets being arranged inside the drum adjacent the inner surface thereof.

18 Claims, 2 Drawing Figures

APPARATUS FOR AT LEAST PARTLY REMOVING ADHERING LIQUID FROM AND/OR EVENLY DISTRIBUTING LIQUID OVER THE SURFACE OF ARTICLES

This invention relates to apparatus for at least partially removing liquid adhering to surfaces of articles from such surfaces and/or evenly distributing such liquid over the surfaces.

Several methods and apparatuses have been developed for removing liquids from such articles by various methods including heating and blowing a gas, such as air, therealong in order to vaporize the liquid. Also, liquids have been removed by rinsing the articles with another liquid. In accordance with these prior methods, the liquid to be removed being distributed in air or in another liquid gives rise to pollution problems and causes additional expense for the subsequently required separation of the removed liquid from the air or other liquid.

Attempts have been made to remove the liquid by centrifugal force, and the attempts which have been made to date are deemed to be unsuitable since maintaining the articles to be treated in a continuous succession at a suitable centrifugal speed for a sufficient time were not heretofore deemed to be possible from a practical standpoint.

This invention provides a solution to the problem of an apparatus necessary for the removal or distribution of liquid over a surface of an article, the solution being in the form of an apparatus characterized by a feeding conveyor, being a hollow non-magnetic drum arranged at the delivery end of the conveyor and being rotatable about its own axis, and by a series of immobile magnets helically arranged within the drum. This apparatus is suitable for either removing a liquid or for evenly distributing a liquid, such as a lacquer, over a surface of an article.

When the apparatus is used for removing liquid from hollow articles, such as can bodies, such articles are positioned with their open ends remote from the axis of the drum. In order that at the same time the liquid may possibly be evenly distributed over the surface of the article, the forces working on the adhering liquid are evenly distributed about the axis of the drum by having the axis of the drum and the helical series of magnets generally vertical. For both the removal of the liquid and the even distribution thereof, a good effect is obtained if the helical series of magnets comprise at least one revolution.

For viscous and/or tenaciously adhering liquids higher peripheral speeds and/or smaller drum radii and/or more revolutions of the helical series of magnets are required than for thin fluid and/or weakly adhering liquids on smooth surfaces. Such variables can be empirically evaluated in practice. It is to be understood that for evenly distributing liquid over an article the radius of the drum has to be chosen large with respect to the dimensions of the article. The articles kept by magnetic attraction on the outer surface of the drum shift in an axial direction because of the pitch of the helical series of magnets. In order to facilitate sliding of the articles on the surface of the drum it is preferred that the drum have a smooth outer surface.

The feeding velocity of the articles is not critical, particularly when the drum has a smooth outer surface, since the articles first will slip on the drum and thereafter gradually are dragged along by the drum. For the same reason the feeding direction of the articles is not important and can either be tangential or radial with respect to the drum surface.

In order to avoid the liquid which is removed from the articles from hitting other articles or being sprayed in the area surrounding the apparatus, it is preferred that the drum be vertically disposed and the articles be delivered at the lower portion of the drum.

If particularly large centrifugal forces are to be used, the magnetic attracting forces must be as great as possible to which end the distance between the series of magnets and the drum has to be as small as possible. In order to control such distances, it is feasible that the drum be conical and the series of magnets describe a conical surface having the same apex angle as the drum. By simple mutual axial movement, the distance can be readily varied.

When lacquering can bodies, particularly those closed at one end, there is a problem of even distribution of the applied lacquer over the surface of the can body since the lacquer is accumulated either at the bottom or at the open end of the can body. Apparatus in accordance with this invention is suitable to obtain an even distribution of the lacquer over the inner surface of such can bodies. Can bodies, after being sprayed with a volatile solvent containing the lacquer are treated on an apparatus formed in accordance with this invention.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
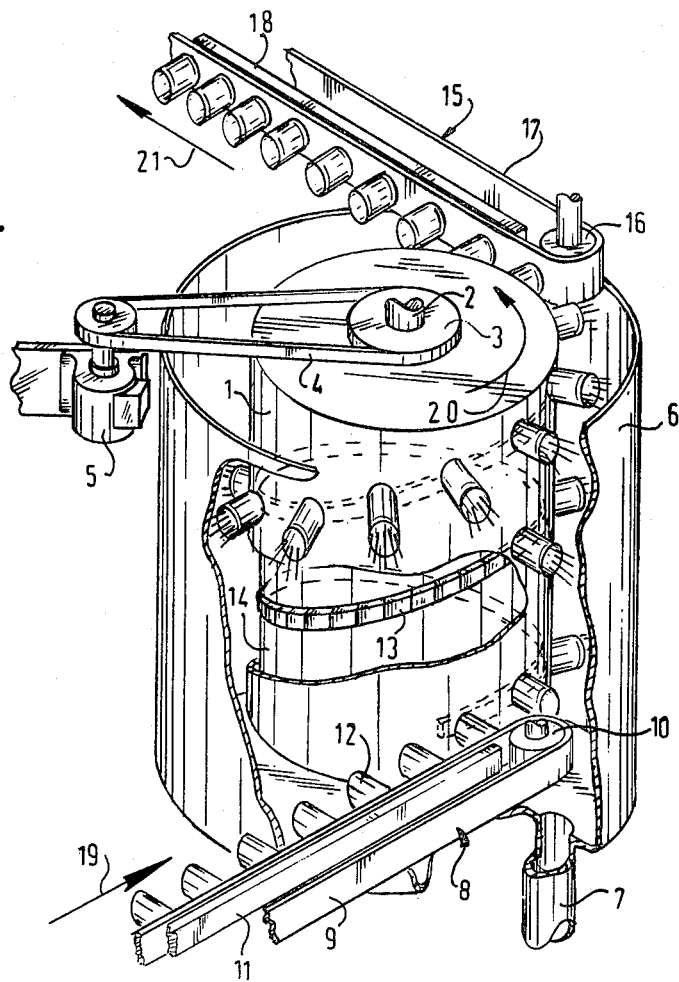
FIG. 1 is a top perspective view with parts broken away and shown in section of a preferred embodiment of the apparatus.

The apparatus for removing adherant liquid by centrifugal action from one-end-open hollow articles, as illustrated in FIG. 1, includes a hollow cylindrical drum 1 formed of non-magnetic material such as aluminum of stainless steel. The drum 1 is positioned with its axis 2 vertical or upstanding. The drum 1 is rotatable about its axis and is driven through a pulley 3 connected to the drum 1 by means of a belt 4 which is engaged over a pulley 5a carried by a suitable driving motor 5. The drum 1 is rotated in the direction of the arrow 20.

A collecting casing 6 is disposed concentric with the drum 1 and is spaced radially around the drum. The casing 6 has a bottom 6a provided with a drain pipe 7 for the removal of the collected liquid.

A feeding conveyor 8 which is illustrated as being in the form of an endless belt 9 guided over a guide roller 10 enters into the lower portion of the casing 6. That part of the belt 9 disposed toward the drum 1 is backed by an elongated bar magnet 11 and is used for feeding can bodies 12 formed of sheet steel toward the drum 1. The can bodies 12 may have one end thereof closed either by an and integrally formed with the bodies or separately formed and secured thereto in a conventional manner.

A helical series of magnets 13 are disposed inside the drum 1. The magnets 13 are carried by an immobile cylinder 14 which also serves to support bearings (not shown) for the drum. The magnets 13 are arranged so that they are closely adjacent the inner surface of the drum while in no way inhibiting the rotation of the drum.

The conveyor belt 9 serves generally to align the can bodies 12 with the starting end of the helical series of magnets 13 and the magnet 11 terminates generally at the starting end of the series of magnets 13 so as to release a can body at the same time it is picked up by the magnets 13.

At the upper end of the helical series of magnets 13 there is the take-up end of a discharge conveyor 15. The conveyor 15 is of the same general construction as the conveyor 8 and includes a guide roll 16 disposed adjacent the upper end of the helical series of magnets 13. An endless belt 17 is guided by the roller 16 and is backed by a magnet bar 18 having a starting end disposed adjacent the terminal end of the helical series of magnets 13.

In the operation of the apparatus, the steel can bodies 12 are fed by the conveyor 8 toward the right end thereof with the can bodies being held on the endless belt 9 by the attraction of the magnet bar 11. The can bodies are conveyed by the belt 9 in the direction of the arrow 19 to the drum 1 rotating in the direction of the arrow 20, the drum 1 rotating within the collecting casing 6.

When the can bodies reach the end of the magnet bar 11, the can bodies become subject to the attractive power of the lower end of the helical series of magnets 13 inside the drum 1 and thus are retained on the outside of the drum. As can bodies are urged to rotate by their frictional engagement with the drum 1, they are also urged to move upwardly along the surface of the drum in accordance with the helical pattern of the magnets 13. At this time it is pointed out that the can bodies, when they have closed ends, are deposited with their closed ends against the drum and with their open ends outermost.

While there may be some initial slippage between the can bodies and the drum 1 in the direction of rotation of the drum, the can bodies will rapidly accelerate to the speed of the drum and will be rotated at the same speed as the drum.

At the upper end of the helical series of magnets 13, the can bodies will be picked up by the discharging conveyor 15 with the can bodies being engaged on the belt 17 by the attraction of the magnet bar 18 and moved in the direction of the arrow 21.

It will be readily apparent that while traversing the helical path on the drum 1, the can bodies 12 and the adhering liquid previously applied thereto are subject to a centrifugal force. The can bodies are kept on the drum by the magnetic attraction forces of the magnets 13, but the liquid is outwardly accelerated and partially flung from or out of the can bodies and partially distributed over the surface of the can bodies. Thus an even distribution can be effected. By varying the diameter of the drum and the rotational speed of the drum, as well as the number of revolutions of the helical series of magnets 13, the effect on the apparatus and the flow and distribution of the liquid can be varied.

Figure 2:
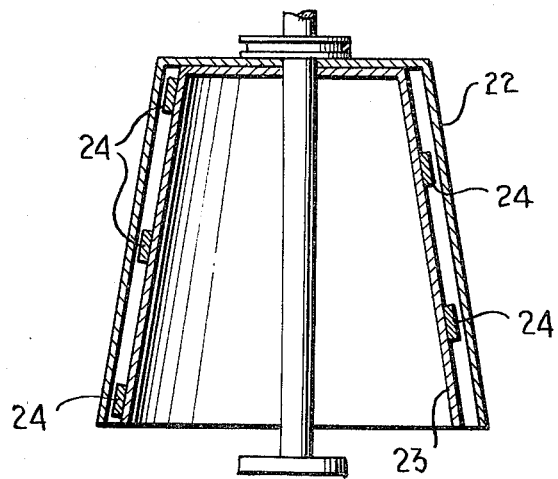
FIG. 2 is a schematic vertical sectional view taken through a modified form of apparatus.

Reference is made to FIG. 2 wherein a modification of the drum is schematically illustrated. In lieu of the drum being a right angle cylinder, the drum can be generally conical and thus broadly a tapered cylinder. Such drum is generally identified by the numeral 22. The drum 22 is telescoped over a further tapered cylinder 23 which is rotationally fixed and corresponds to the cylinder 14. A helical series of magnets 24 is carried by the cylinder 23 and disposed closely adjacent the inner surface of the drum 22. It will be seen that by vertically adjusting the drum 22 relative to the cylinder 23, the spacing between the magnets 24 and the inner surface of the drum 22 may be readily varied. No specific means have been illustrated to effect this adjustment.

What is claimed as new is:

1. A conveyor system comprising a non-magnetic drum mounted for rotation about an axis, a plurality of fixed magnets disposed within said drum in closely adjacent relation to said drum and defining a helical path, a supply conveyor for delivering magnetically attractive members to said drum generally in alignment with one end portion of said helical path, and a receiving conveyor for receiving members conveyed by said drum at an opposite end portion of said helical path.

2. The conveyor system of claim 1 wherein said axis is generally vertical.

3. The conveyor system of claim 2 wherein said supply conveyor is associated with a lower portion of said drum.

4. The conveyor system of claim 1 wherein said helical path extends at least 360°.

5. The conveyor system of claim 1 wherein said drum has a smooth external surface.

6. The conveyor of claim 1 wherein said drum is generally cylindrical.

7. The conveyor of claim 1 wherein said drum is generally conical and the spacing of said helical path from said axis changes from one end of said path to the other with said helical path having a substantially constant spacing from said drum.

8. The conveyor of claim 2 wherein said supply conveyor and said receiving conveyors are each disposed in a generally horizontal plane for conveying tubular members with axes of such members horizontally disposed.

9. The conveyor of claim 1 together with drive means for rotating said drum about said axis at a peripheral speed sufficient to effect flow of a selected liquid over the surfaces of articles adhering to said drum.

10. The conveyor of claim 9 wherein said drum peripheral speed is at least sufficiently great to evenly spread a selected liquid over the article surfaces.

11. The conveyor of claim 9 wherein said drum peripheral speed is at least sufficiently great to remove the selected liquid from articles.

12. The conveyor of claim 11 wherein a collection casing extends about the periphery of said drum for collecting the liquid removed from the articles.

13. The conveyor of claim 12 wherein said axis is generally vertical, and said collection casing is generally in the form of a tub.

14. A method of selectively evenly distributing a previously applied liquid over the surface of an article or removing excess of such liquid from an article, said method comprising the steps of supplying articles to an exterior surface of a drum, attracting the articles to the exterior surface of the drum while rotating the drum, moving the articles in sequence about a generally helical path while on said drum and at a speed sufficient to effect the desired flow of liquid relative to the articles.

15. The method of claim 14 wherein liquid removed from articles is caught at a location surrounding the drum.

16. The method of claim 14 wherein the articles are tubular members having axes radiating from the drum.

17. The method of claim 14 wherein the attracting of articles to the exterior surface of the drum is effected magnetically.

18. The method of claim 14 wherein the attracting of articles to the exterior surface of the drum is effected by means of fixed magnets arranged in a helical path.

* * * * *